(12) United States Patent
Kaneko

(10) Patent No.: US 8,602,061 B2
(45) Date of Patent: Dec. 10, 2013

(54) FLOW CONTROL VALVE

(75) Inventor: Kenichiro Kaneko, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 292 days.

(21) Appl. No.: 13/036,163

(22) Filed: Feb. 28, 2011

(65) Prior Publication Data

US 2011/0226352 A1 Sep. 22, 2011

(30) Foreign Application Priority Data

Mar. 16, 2010 (JP) .................................... 2010-58888

(51) Int. Cl.
*F16K 15/16* (2006.01)

(52) U.S. Cl.
USPC ............................ 137/855; 137/856; 137/527

(58) Field of Classification Search
USPC ............ 137/852, 855, 856, 859, 527, 516.25, 137/515.5, 513.3
See application file for complete search history.

(56) References Cited

U.S. PATENT DOCUMENTS 314,107 A * 3/1885 Chappell ....................... 137/858
5,657,734 A 8/1997 Sawamoto et al.

FOREIGN PATENT DOCUMENTS

JP 08-216707 A 8/1996

* cited by examiner

*Primary Examiner* — Kevin Lee
*Assistant Examiner* — Macade Brown
(74) *Attorney, Agent, or Firm* — Posz Law Group, PLC

(57) ABSTRACT

A flow control valve includes a first passage portion having a seal portion formed at the rim of the opening of an outlet port of a first passage, a second passage portion having a second passage inflected from the first passage, and a valve plate. The valve plate has a valve body for opening and closing the outlet port, and a mounted portion formed at the outside peripheral end of the valve body and adapted for mounting to the mounting portion, and is adapted to open and close with mounted portion as the fulcrum point. The valve body includes a seat portion adapted to seat onto the seal portion, and an extension portion integrally formed with the seat portion and protruding towards the outflow side of the second passage from the seal portion.

8 Claims, 7 Drawing Sheets

FLOW CONTROL VALVE

This application claims the benefit of and priority from Japanese Application No. 2010-58888 filed Mar. 16, 2010, the content of which is incorporated herein by reference.

BACKGROUND OF THE INVENTION

1. Field of the Invention

The present invention relates to a flow control valve for controlling flow between a fuel tank in an automobile or the like, and the outside.

2. Description of the Related Art

One known related art design for a flow control valve includes a circulation unit for circulating fuel vapors inside the fuel tank, disposed between the inlet pipe and the canister (JP-A 8-216707). The circulation unit includes a breather pipe that connects the filler neck with the fuel tank interior; and a flow control valve disposed at the inlet of the breather pipe. The flow control valve is situated inside the breather pipe passage and features a check valve having a ball valve and a spring, and is designed to open and shut in response to pressure applied to the ball valve. According to this feature, utilizing the rise in tank internal pressure of the fuel tank that occurs during fueling, the flow control valve is opened only when a prescribed pressure is exceeded, whereby fuel vapors inside the fuel tank are circulated to the filler neck through the breather pipe, thereby reducing the amount of outside air drawn in from outside the filler neck and reducing the amount of fuel vapors produced.

However, according to the flow control valve, if the pressure-receiving surface area of the ball valve is larger in size for increasing the ventilation volume of fuel vapors and achieving smooth circulation of the fuel vapors, the breather pipe and the passage diameter thereof must unavoidably be larger as well, creating the problem of larger scale. Moreover, during fueling, the fuel gun has the characteristic of a low flow rate in the initial period following pushing of the fueling switch, followed by rapid increase thereafter. In order to compensate for this characteristic, it would be preferable for the flow control valve to have a small aperture at low pressure, and for the aperture to increase rapidly as the pressure rises. However, a problem with conventional flow control valves is that valve opening characteristics like those described above are difficult to achieve.

SUMMARY

An advantage of some aspects of the invention is to provide a flow control valve that despite compact size ensures high ventilation volume, and by which valve opening characteristics appropriate for fueling may be readily achieved.

According to an aspect of the invention, there is to provide a flow control valve disposed in a passage connecting an interior of a fuel tank with outside. The valve comprises a passage-defining member including a first passage portion that has a first passage having an outlet port and a seal portion formed at a rim of an opening of the outlet port; and a second passage portion that has a second passage inflected from the first passage; and a valve mechanism adapted to seat onto the seal portion, and to open and close in response to pressure applied to the outlet port. The passage-defining member includes a mounting portion disposed to an outside of the seal portion for mounting the valve mechanism; the valve mechanism has a valve body for opening and closing the outlet port, and a mounted portion formed at an outside peripheral end of the valve body and adapted for mounting to the mounting portion, the valve mechanism being configured to open and close the outlet port with the mounted portion as a fulcrum point; and the valve body includes a seat portion adapted to seat onto the seal portion, and an extension portion integrally formed with the seat portion and protruding towards an outflow side of the second passage from the seal portion.

In the valve mechanism of the first aspect, the valve body is situated in an inflected passage in the second passage, and opens in response to fuel vapor pressure from the outlet port. At this time, the valve body acts as a substantially inclined guide face leading from the first passage towards the second passage. Consequently, while maintaining flow regulation of the fuel vapors flowing out from the outlet port of the first passage, the vapors are funneled towards the outlet end of the second passage, and specifically are able to flow smoothly from the first passage to the second passage at a high flow rate with minimal pressure loss.

Where the present invention is employed in the breather pipe of a fuel tank, during fueling, the fuel gun has the characteristic of a low flow rate in the initial period following pushing of the fueling switch, followed by rapid increase thereafter. Consequently, from the standpoint of minimizing escape of fuel vapors to the outside, it is preferable for the valve mechanism of the flow control valve to have valve opening characteristics matched to this characteristic of the fuel gun. In the valve mechanism according to the present invention, as tank internal pressure increases with rising fuel level and the valve body initially opens, air pressure also acts on the bottom face of the extension portion, causing the valve aperture to increase sharply. Consequently, the valve mechanism is adapted to situations of low flow rate during initial fueling, and sharp increase in flow rate thereafter.

Further, because the extension portion of the valve body is situated in an inflected space of the second passage, despite the large pressure-receiving surface area, it is not necessary to arrange the extension portion in the direction of the second passage, or for the second passage to have a large diameter. Consequently, larger scale of the flow control valve is not required to ensure a high flow rate.

In another possible feature according to a second aspect, the valve mechanism has a valve plate formed from a thin plate of metal; and the mounted portion is inflected from the valve body such that the valve plate gives rise to spring force in the valve closing direction. Owing to this feature, when the force of a fluid acts on the valve body, the valve plate experiences elastic deformation about a fulcrum point lying in the region connecting the valve body and the mounted portion, and thereby acts as a spring for imparting urging force in the direction of seating of the valve body onto the seal portion. This eliminates the need for a separate coil spring, and provides a simpler design.

In another possible feature according to a third aspect, the seat portion has a connecting hole that passes through the seat portion, and the second passage portion has a seal face adapted to close off the connecting hole when the valve body opens by a prescribed angle. The connecting hole according to this feature allows flow at a low flow rate when the valve is closed, but when the valve aperture of the valve body increases the opening is closed off by the seal face so that vapor flow through the connecting hole does not give rise to turbulence.

In another possible feature according to a fourth aspect, the second passage has a communicating chamber inflected from the first passage, and a pipe passage connected to the communicating chamber; and a guide member that with the valve body in the open state surrounds the valve body from the outside with the exception of a passage leading towards the pipe passage is disposed in the communicating chamber. According to this feature, fuel vapors outflowing from the outlet port may flow to the pipe passage without eddying flow at the periphery of the communicating chamber, whereby pressure loss may be reduced.

In another possible feature according to a fifth aspect, the first passage portion and the second passage portion are formed by separate members, and a mounting portion adapted to mount the valve plate through clasping of the mounted portion is formed at the mating faces thereof. According to this feature, the contours of the mounting portion and the contours of the die therefor can be simpler.

These and other objects, features, aspects, and advantages of the present invention will become more apparent from the following detailed description of the preferred embodiments with the accompanying drawings.

DESCRIPTION OF THE PREFERRED EMBODIMENTS (1) General Features of Fuel Tank Unit

Figure 1:
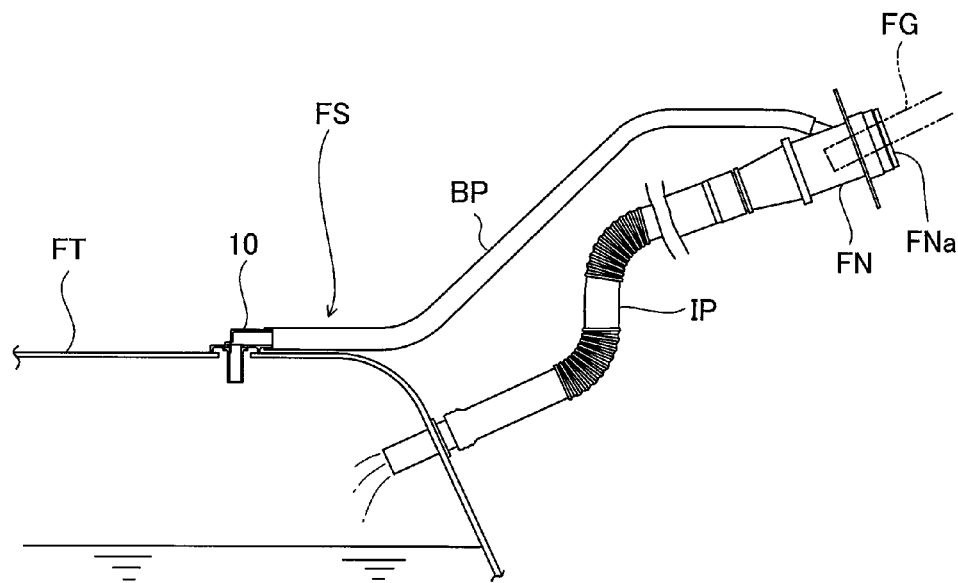
FIG. 1 is a schematic diagram showing a fuel tank unit for supplying fuel to the fuel tank of an automobile.

FIG. 1 is a schematic diagram showing a fuel tank unit FS for supplying fuel to the fuel tank FT of an automobile. The fuel tank unit FS is connected to a fuel tank FT made of resin, and is adapted to funnel fuel supplied from a fuel gun FG to the fuel tank FT; the unit includes a filler neck FN having an inlet FNa that is opened and shut by a fuel cap (not shown); an inlet pipe IP made of metal or resin and connected to one end of the filler neck FN; a flow control valve 10 installed on the upper part of the fuel tank FT; and a breather pipe RP connecting the flow control valve 10 and the filler neck FN. Owing to the design of the fuel tank unit FS, when the fuel cap is removed and fuel is injected into the filler neck FN from the fuel gun FG during a fueling operation, the fuel is supplied to the fuel tank FT interior from the inlet pipe IP. At this time, the breather pipe BP returns into the filler neck FN fuel vapors that have outflowed through the flow control valve 10 from inside the fuel tank FP, and circulates the vapors as fueling proceeds, thereby reducing the amount of fuel vapors producing inside the fuel tank FT so that fueling takes place smoothly. The flow control valve 10 is furnished with a valve mechanism (check valve) that opens and shuts in response to tank internal pressure, and adjusts the circulation rate at which fuel vapors flow into the breather pipe BP, in response to rise in tank internal pressure during fueling.

(2) Features of Flow Control Valve 10

Figure 2:
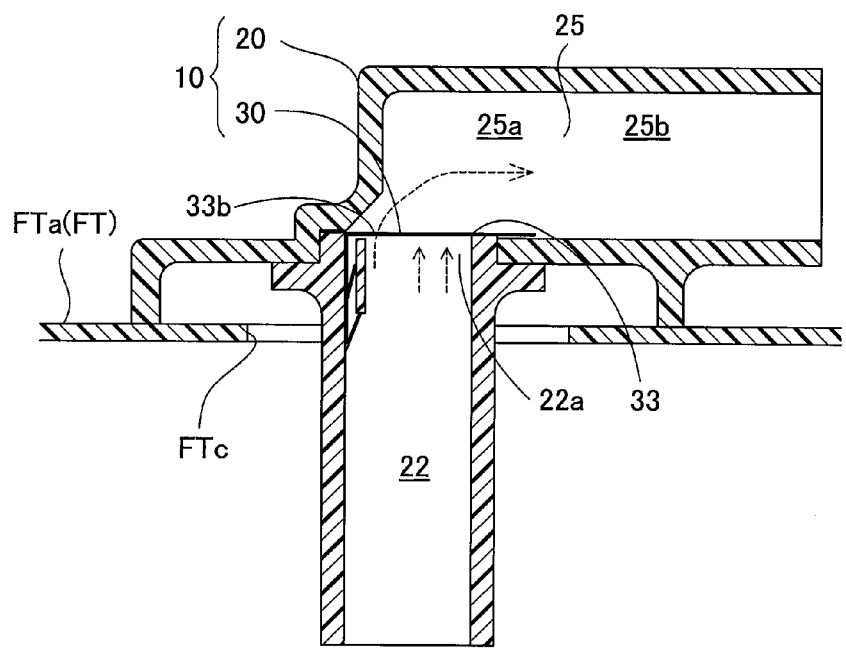
FIG. 2 is an enlarged cross sectional view of the vicinity of the flow control valve of FIG. 1.

FIG. 2 is an enlarged cross sectional view of the vicinity of the flow control valve 10 of FIG. 1. A tank opening FTc is formed in a top wall FTa of the fuel tank FT, and the flow control valve 10 is mounted partially intruding therein. The flow control valve 10 includes a passage-defining member 20, and a valve mechanism 30 mounted on the passage-defining member 20.

Figure 3:
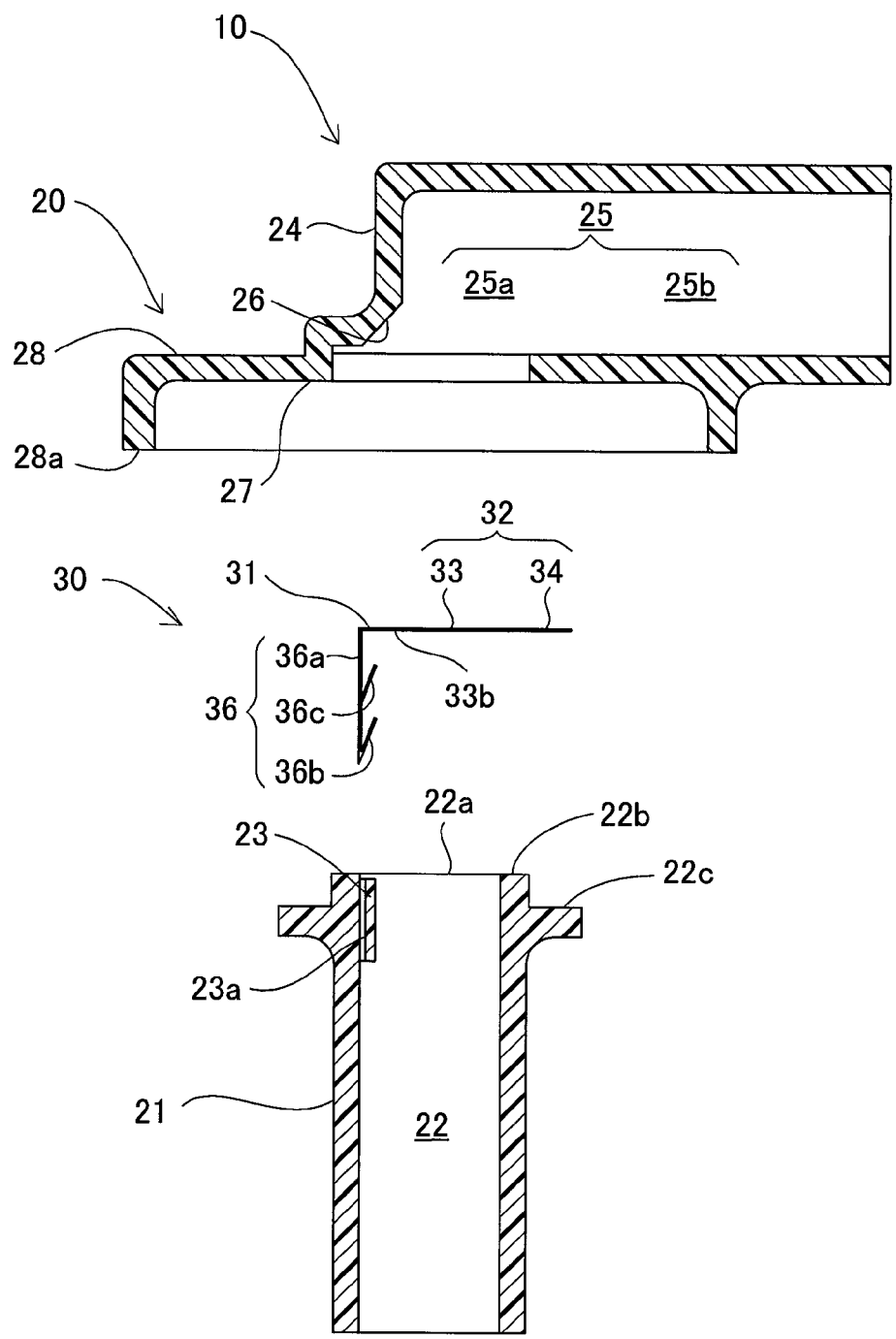
FIG. 3 is an exploded cross sectional view of the flow control valve.
Figure 4:
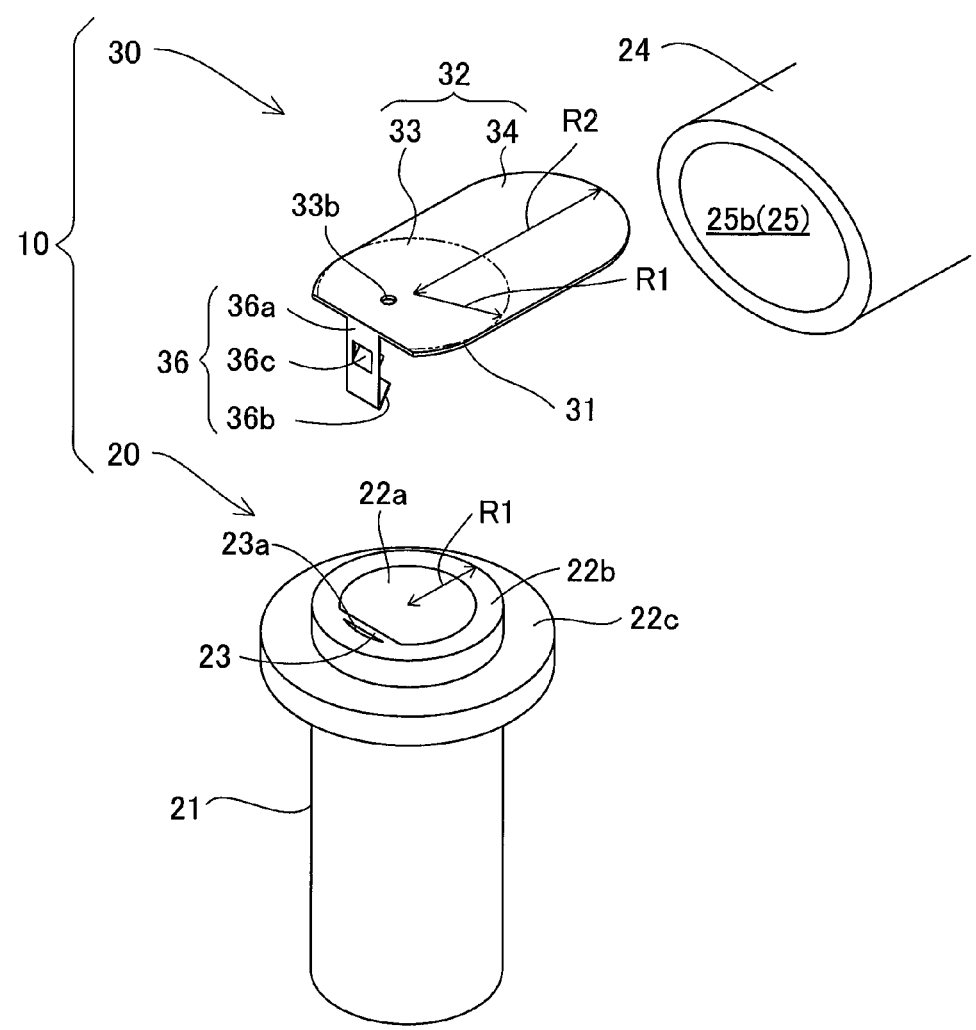
FIG. 4 is an exploded perspective view of the flow control valve.

FIG. 3 is an exploded cross sectional view of the flow control valve 10; and FIG. 4 is an exploded perspective view of the flow control valve 10. The passage-defining member 20 includes a first passage portion 21 provided as the inlet-side member and a second passage portion 24 provided as the outlet-side member, and these portions are welded together. The first passage portion 21 has a first passage 22 that opens into the fuel tank FT interior, with the upper part of this first passage 22 serving as an outlet port 22a. The rim of the opening of the outlet port 22a serves as a seal portion 22b. A mounting portion 23 is formed in the upper part of the first passage portion 21. The mounting portion 23 is a portion for attaching the valve mechanism 30, and includes an insertion hole 23a.

The second passage portion 24 has a second passage 25 connected to the first passage 22 and inflected at a right angle therefrom. The second passage 25 has a communicating chamber 25a situated on the first passage 22 side and a pipe passage 25b connected to the communicating chamber 25a. The pipe passage 25b is connected to the breather pipe BP (FIG. 1). A seal face 26 is formed on the inside wall of the communicating chamber 25a. An inside welding portion 27 is formed in the lower portion of the second passage portion 24, and is welded to a flange 22c at the top of the first passage portion 21. A flange portion 28 protrudes from the outside periphery of the inside welding portion 27 at the lower portion of the second passage portion 24. The flange portion 28 has a tank welding portion 28a intended to be welded at the bottom thereof to the fuel tank.

In FIG. 4, the valve mechanism 30 has a valve plate 31 that is formed by press cutting and bending part of a thin metal plate. The valve plate 31 has the form of a plate spring integrally formed by a valve body 32 and a mounted portion 36. The valve body 32 includes a seat portion 33 identical in outside diameter to the circular seal portion 22b and adapted to seat on the seal portion 22b, and an extension portion 34 integrally formed with the seat portion 33 and protruding beyond the seal portion 22b towards the pipe passage 25b end of the second passage 25, and in this instance has an oval shape. Here, where the radius of the seal portion 22b is designated as R1 and the major axis of the valve body 32 towards the extension portion 34 end is designated as R2, R2>R1. A connecting hole 33b is formed in the seat portion 33. The connecting hole 33b is a through-hole of smaller passage area than the outlet port 22a, and is opened and shut by the seal face 26 of FIG. 3.

The mounted portion 36 is a component adapted for installation in the mounting portion 23 of the passage-defining member 20 to support the valve body 32 in opening and closing fashion, and includes a mounting body 36a bent at a right angle from the valve body 32, and a detent tab 36b and an engaging tab 36c formed by bending and uplifting of portions of the mounting body 36a through them press forming or the like. To mount the mounted portion 36 in the mounting portion 23, the mounted portion 36 is inserted into the mounting portion 23. The detent tab 36b and the engaging tab 36c are thereby compressed by the opposing walls that form the insertion hole 23a as the mounted portion 36 is inserted towards the bottom of the insertion hole 23a. The detent tab 36b then emerges from the bottom end of the insertion hole 23a and recovers its shape through elastic force, thereby engaging and becoming detained at the bottom end of the mounted portion 36. At this time, because the engaging tab 36c is compressed within the insertion hole 23a, the mounted portions 36 is secured within the insertion hole 23a such that chattering does not occur.

(3) Operation of Flow Control Valve 10

Figure 5:
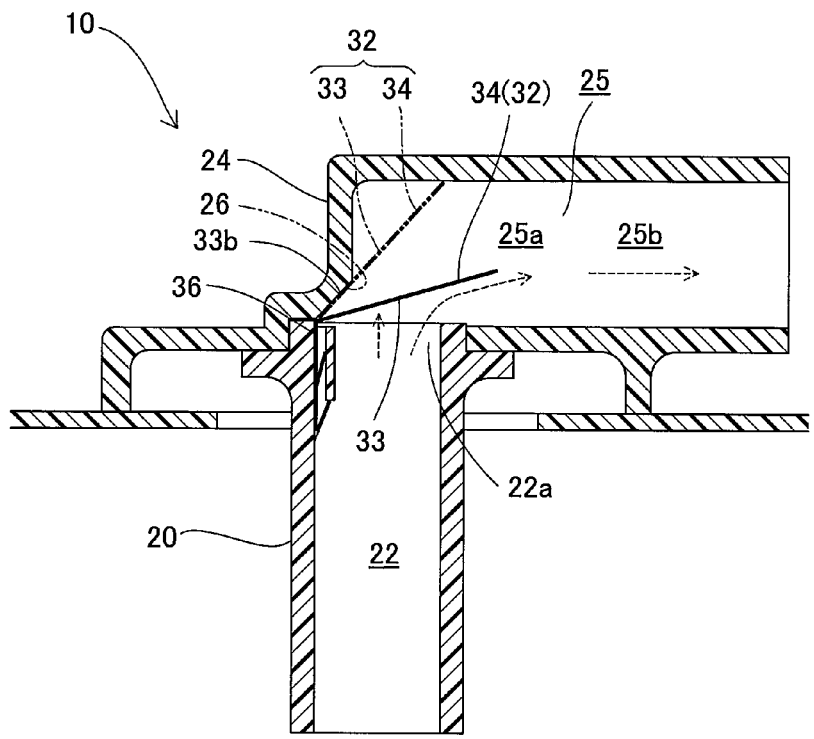
FIG. 5 shows the operation of the flow control valve.

Next, operation of the flow control valve 10 is described. As shown in FIGS. 1 and 2, during fueling, air (fuel vapors) entering from the first passage 22 of the passage-defining member 20 reaches the outlet port 22a, and pressure is applied to the seat portion 33. Because the connecting hole 33b is formed in the seat portion 33 (refer to FIG. 4), the air passes through the connecting hole 33b and is then returned to the filler neck FN through the communicating chamber 25a and the pipe passage 25b of the second passage 25, and the breather pipe BP. Then, with an increase of air, the air pushes the seat portion 33 of the valve plate 31. Subsequently, as depicted in FIG. 5, when the air pressure applied to the seat portion 33 exceeds the spring force created by the valve body 32 and the mounted portion 36, the valve opens about a fulcrum point lying in the region connecting the valve body 32 and the mounted portion 36. Specifically, when the valve body 32 is pushed by a flow of air, the valve body 32 experiences inclination centered on the upper part of the mounted portion 36, forming a gap with respect to the outlet port 22a so that air flows out. At this time, when the valve body 32 opens, air pressure also bears on the lower face of the extension portion 34, enlarging the opening angle of the valve body 32 and increasing the flow rate. As the opening angle of the valve body 32 increases and the valve body 32 touches the seal face 26 of the second passage portion 24 as shown by the double-dot and dash line so that the connecting hole 33b is obstructed by the seal face 26, the flow of air through the connecting hole 33b is interrupted. Subsequently, when the force that the valve body 32 receives by the air outflowing from the first passage 22, falls below the spring force in the valve closing direction, the valve body 32 shuts.

(4) Effects of the Embodiment

The flow control valve 10 according to the embodiment described above affords the following effects.

(4)-1 When fluid force acts on the valve body 32, the valve plate 31 experiences elastic deformation about a fulcrum point lying in the region of connection to the mounted portion 36 and thereby acts as a spring that imparts urging force in the direction of seating the valve body 32 on the seal portion 22b, thus eliminating the need for a separate coil spring, and providing a simpler design.

(4)-2 The valve plate 31 is situated in the communicating chamber 25a which is infected from the second passage 25, and upon opening of the valve body 32 acts as a substantially inclined guide face leading from the first passage 22 towards the second passage 25. Consequently, while maintaining flow regulation of the air flowing out from the outlet port 22a of the first passage 22, the air is funneled into the pipe passage 25b to afford a smooth flow of air at a high flow rate with minimal pressure loss in the communicating chamber 25a.

Figure 6:
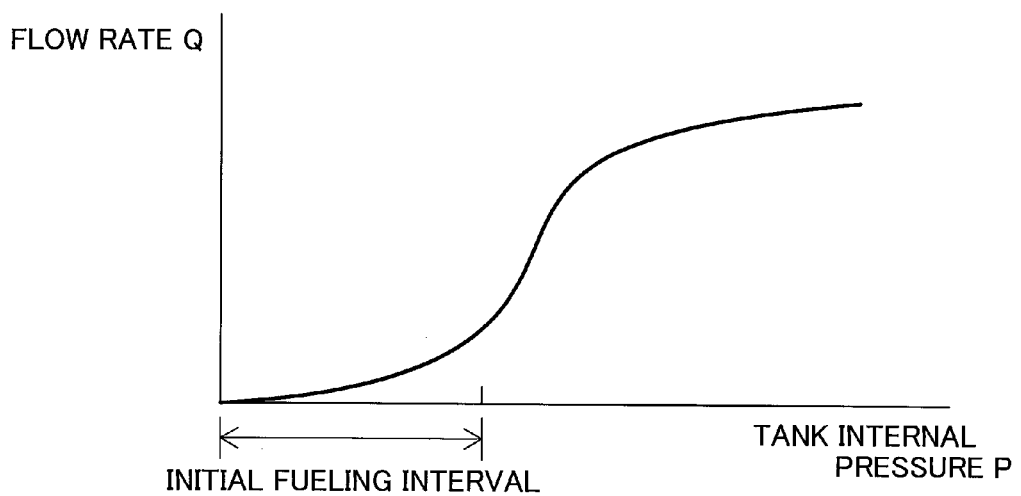
FIG. 6 shows flow rate characteristics of the flow control valve during fueling.

(4)-3 FIG. 6 shows the flow rate of the flow control valve 10 during fueling. When fueling, the fuel gun has the characteristic of a low flow rate in the initial period following pushing of the fueling switch, followed by rapid increase thereafter. Consequently, from the standpoint of minimizing escape of fuel vapors to the outside, it is preferable for the valve mechanism of the flow control valve to have valve opening characteristics matched to this characteristic of the fuel gun. In the initial stage of fueling, the valve mechanism 30 according to the present embodiment has a small vent area equal to the connecting hole 33b of the valve plate 31, and therefore the outflow rate is low; thereafter, as the fueling level increases and tank internal pressure rises, once the valve body 32 of the valve plate 31 opens air pressure also acts on the bottom face of the extension portion 34, causing the valve aperture to increase sharply. Consequently, the valve mechanism 30 exhibits the characteristics depicted in FIG. 6, and is adapted to situations of low flow rate during initial fueling, and sharp increase in flow rate thereafter.

(4)-4 The extension portion 34 of the valve body 32 is situated in an inflected space of the second passage 25, and therefore despite the large pressure-receiving surface area thereof, it is not necessary for the diameter of the second passage 25 to be large. Consequently, larger scale of the flow control valve 10 is not required to ensure a high flow rate.

(4)-5 As shown in FIG. 5, the opening angle of the valve body 32 of the valve plate 31 is restricted when the valve body 32 touches the seal face 26. Consequently, the valve body 32 does not open excessively, and plastic deformation in the region of connection of the valve body 32 and the mounted portion 36 is prevented, thereby affording excellent durability and reliable shutting operation of the valve body 32.

(4)-6 The seat portion 33 is perforated by the connecting hole 33b, and the second passage portion 24 features a seal face 26 adapted to close off the connecting hole 33b when the valve body 32 opens by a prescribed angle. When the valve is shut, low ventilation volume may be ensured by the connecting hole 33b, and as the aperture of the valve body 32 becomes larger, the connecting hole 33b becomes closed off by the seal face 26 so that vapor flow through the connecting hole 33b does not give rise to turbulence, resulting increased pressure loss. Further, because the connecting hole 33b is formed to pass through the valve body 32, fuel that has outflowed towards the second passage 25 side can be returned to the fuel tank FT even when the valve body 32 is shut.

(5) Other Embodiments

It is to be understood that there is no intention to limit the invention to the preceding embodiment, and there are various other possible modes for working the invention without departing from the spirit thereof, such as the following modifications, for example.

Figure 7:
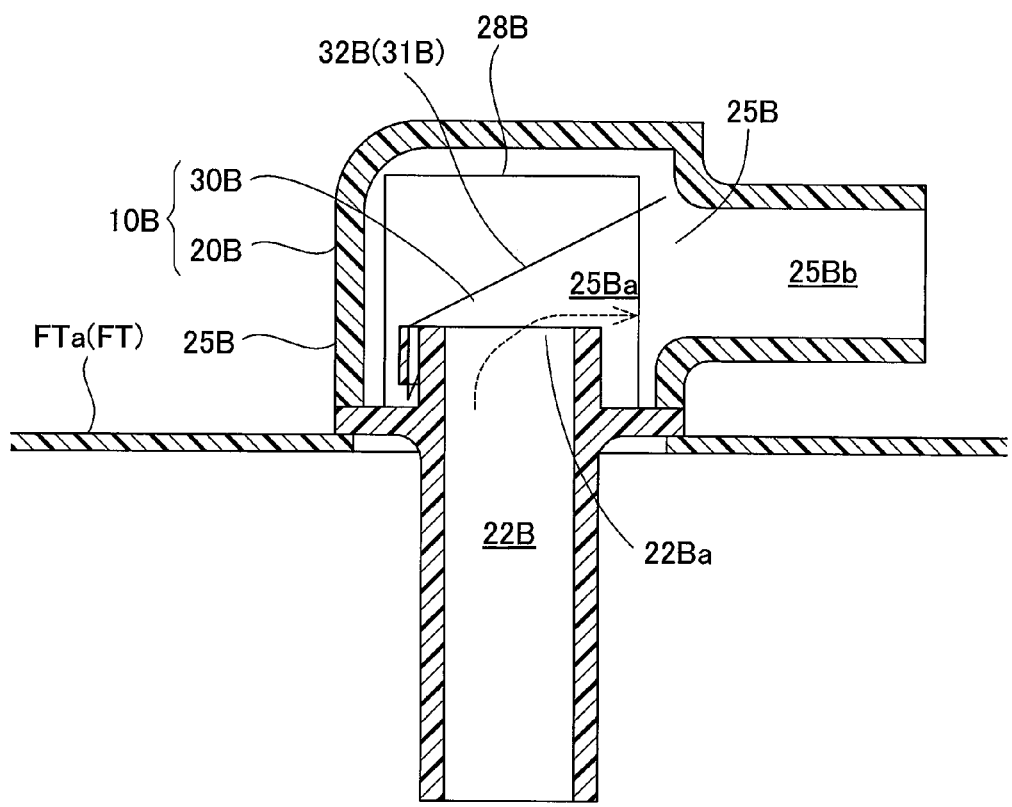
FIG. 7 is a cross sectional view depicting a flow control valve according to another embodiment.
Figure 8:
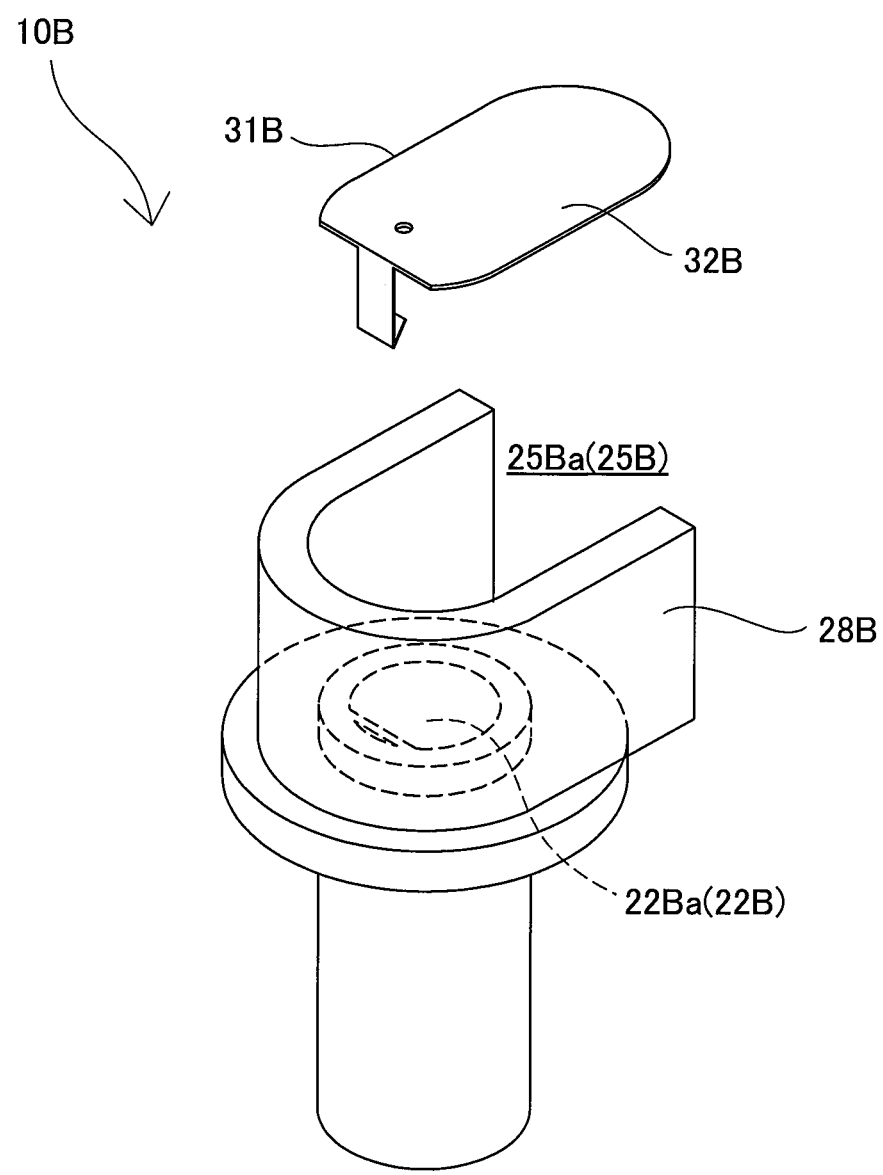
FIG. 8 is a fragmentary exploded perspective view depicting the flow control valve according to another embodiment.
Figure 9:
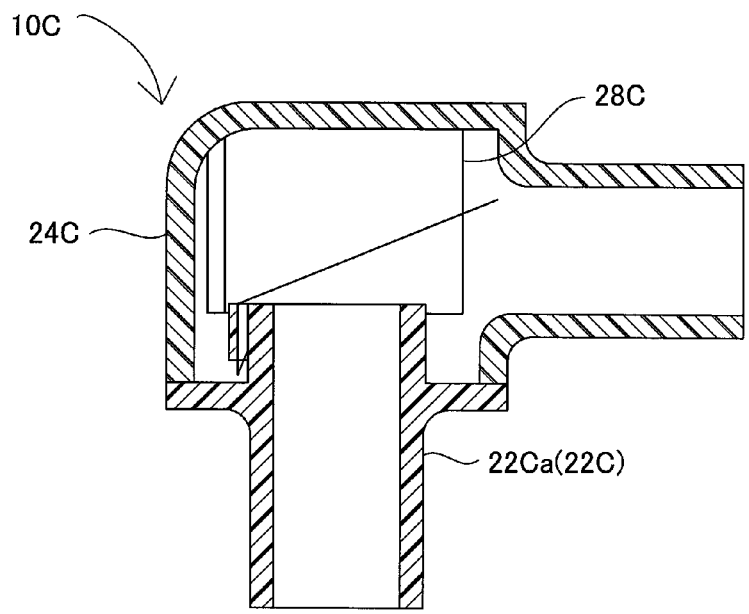
FIG. 9 is a cross sectional view depicting a modified example according to another embodiment.

(5)-1 FIG. 7 is a cross sectional view depicting a flow control valve 10B according to another embodiment; and FIG. 8 is a fragmentary exploded perspective view of the flow control valve 10B. The present embodiment features an arrangement for guiding the flow of fuel vapors. In FIGS. 7 and 8, the flow control valve 10B includes a second passage 25B having a communicating chamber 25Ba inflected from a first passage 22B, and a pipe passage 25Bb connecting with the communicating chamber 25Ba. A guide member 28B is positioned in the communicating chamber 25Ba. The guide member 28B is designed such that, with a valve body 32B of a valve plate 31B in the open state, the member surrounds the valve body 32B from the outside with the exception of a passage leading towards the pipe passage 25Bb. Owing to this feature, fuel vapors outflowing from an outlet port 22Ba may flow to the pipe passage 25Bb without eddying flow at the periphery of the communicating chamber 25Ba, and pressure loss may be reduced. As shown by a flow control valve 10C depicted in FIG. 9, a guide member 28C may be integrally formed from below a second passage portion 24C so as to cover the top of an outlet port 22Ca of a first passage 22C.

Figure 10:
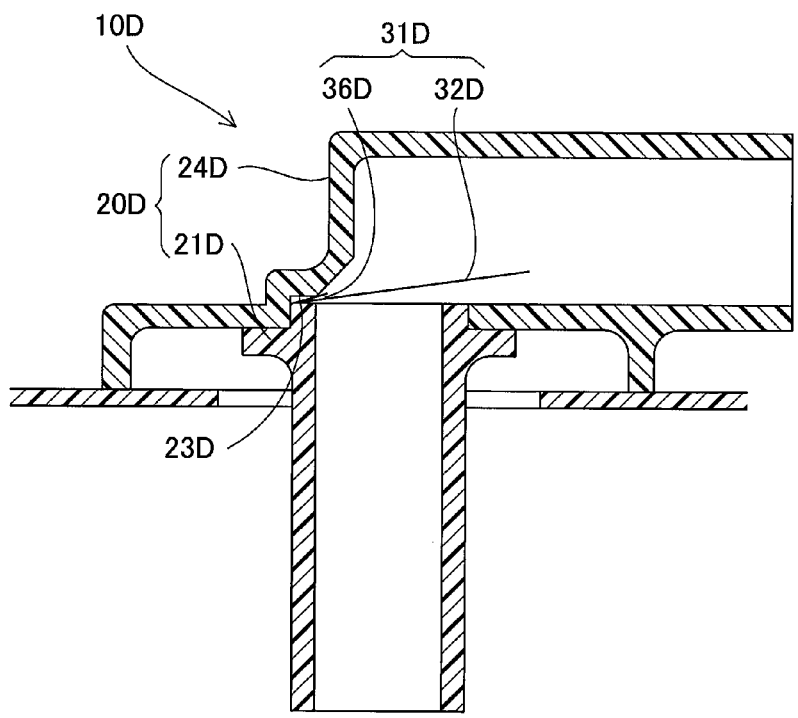
FIG. 10 is a cross sectional view depicting a flow control valve according to yet another embodiment.

(5)-2 FIG. 10 is a cross sectional view depicting a flow control valve 10D according to yet another embodiment. The present embodiment features a mounting structure for a plate valve 31D. Specifically, in the flow control valve 10D, a first passage portion 21D and a second passage portion 24D are formed as separate members, and a mounting portion 23D is formed at the mating faces thereof. The plate valve 31D is secured to a passage-defining member 20D through clasping of a mounted portion 36D that is formed at the end of the valve body 32D. According to the present embodiment, the contours of the mounting portion 23D formed in the upper part of the first passage portion 21D, and the contours of the die therefor, can be simpler.

In the preceding embodiment, the valve mechanism is formed by a valve plate which is a single thin metal plate; however, no limitation is imposed thereby, and any arrangement furnished with valve body and a spring for urging the valve body in the closed direction may be employed.

The flow control valve according to the preceding embodiment is described as having an arrangement for a breather pipe, but no limitation is imposed thereby, and the valve could instead be disposed in a passage connecting the fuel tank with the canister.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A flow control valve disposed in a passage connecting an interior of a fuel tank with outside, comprising:
    a passage-defining member including (i) a first passage portion that has a first passage having an outlet port and a seal portion formed at a rim of an opening of the outlet port, and (ii) a second passage portion that has a second passage inflected from the first passage; and
    a valve mechanism adapted to seat onto the seal portion, and to open and close in response to pressure applied to the outlet port;
    wherein the passage-defining member includes a mounting portion disposed to an outside of the seal portion for mounting the valve mechanism;
    the valve mechanism has (i) a valve body for opening and closing the outlet port, and (ii) a mounted portion formed at an outside peripheral end of the valve body and adapted for mounting to the mounting portion, the valve mechanism being configured to open and close the outlet port with the mounted portion as a fulcrum point;
    the valve body includes a seat portion adapted to seat onto the seal portion, and an extension portion integrally formed with the seat portion and protruding towards an outflow side of the second passage from the seal portion,
    the seat portion has a connecting hole that passes through the seat portion, and
    the second passage portion has a seal face adapted to close the connecting hole when the valve body opens by a prescribed angle.

2. The flow control valve in accordance with claim 1, wherein
    the valve mechanism has a valve plate formed from a thin plate of metal, and the valve plate forms the valve body and the mounted portion inflected from the valve body to give rise to spring force in a valve closing direction.

3. The flow control valve in accordance with claim 2, wherein
    the first passage portion and the second passage portion are formed by separate members, and
    the mounting portion is configured to mount the valve plate by clasping the mounted portion between the first passage portion and the second passage portion.

4. The flow control valve in accordance with claim 1, wherein
    the first passage portion and the second passage portion are formed by separate members, and
    the mounting portion is configured to mount the valve plate by clasping the mounted portion between the first passage portion and the second passage portion.

5. A flow control valve disposed in a passage connecting an interior of a fuel tank with outside, comprising:
    a passage-defining member including (i) a first passage portion that has a first passage having an outlet port and a seal portion formed at a rim of an opening of the outlet port, and (ii) a second passage portion that has a second passage inflected from the first passage; and
    a valve mechanism adapted to seat onto the seal portion, and to open and close in response to pressure applied to the outlet port;
    wherein the passage-defining member includes a mounting portion disposed to an outside of the seal portion for mounting the valve mechanism;
    the valve mechanism has (i) a valve body for opening and closing the outlet port, and (ii) a mounted portion formed at an outside peripheral end of the valve body and adapted for mounting to the mounting portion, the valve mechanism being configured to open and close the outlet port with the mounted portion as a fulcrum point;
    the valve body includes a seat portion adapted to seat onto the seal portion, and an extension portion integrally formed with the seat portion and protruding towards an outflow side of the second passage from the seal portion,
    the second passage has a communicating chamber inflected from the first passage, and a pipe passage connected to the communicating chamber; and
    the passage-defining member has a guide member that is disposed in the communicating chamber and surrounds an outside of the valve body, wherein the guide member has a passage leading towards the pipe passage in an open state of the valve body.

6. The flow control valve in accordance with claim 5, wherein
    the valve mechanism has a valve plate formed from a thin plate of metal, and the valve plate forms the valve body and the mounted portion inflected from the valve body to give rise to spring force in a valve closing direction.

7. The flow control valve in accordance with claim 6, wherein
    the first passage portion and the second passage portion are formed by separate members, and
    the mounting portion is configured to mount the valve plate by clasping the mounted portion between the first passage portion and the second passage portion.

8. The flow control valve in accordance with claim 5, wherein
    the first passage portion and the second passage portion are formed by separate members, and
    the mounting portion is configured to mount the valve plate by clasping the mounted portion between the first passage portion and the second passage portion.

* * * * *